United States Patent [19]
Larkin

[11] 3,738,598
[45] June 12, 1973

[54] AMPHIBIOUS APPARATUS FOR CONVENTIONAL LAND AIRCRAFT

[76] Inventor: Wallace K. Larkin, 74 Hollins Drive, Santa Cruz, Calif. 95060

[22] Filed: Apr. 10, 1972

[21] Appl. No.: 242,417

[52] U.S. Cl............... 244/105, 9/1 T, 114/66.5 R
[51] Int. Cl............................................. B64c 25/54
[58] Field of Search.............. 244/105, 101, 100 R, 244/106; 114/66.5 F, .5 F

[56] References Cited
UNITED STATES PATENTS

| R21,120 | 6/1939 | De Seversky | 244/101 |
| 1,603,866 | 10/1926 | Rohrbach | 244/106 |
| 2,064,674 | 12/1936 | Luburg et al. | 244/105 |
| 3,159,364 | 12/1964 | Sheaffer et al. | 244/105 X |

Primary Examiner—Milton Buchler
Assistant Examiner—Paul E. Sauberer
Attorney—A. C. Smith

[57] ABSTRACT

An improved float assembly is adapted to conveniently attach to the existing landing gear of a conventional land-type aircraft and includes a centrally positioned primary float structure which attaches to the existing landing gear struts and includes secondary or stabilizing float structures which attach to the existing axles for the ground-engaging wheels of the landing gear. Directional control for steerage while waterborne is aided by a water rudder on the primary float which is operated from the steering mechanism of the conventional landing gear.

8 Claims, 5 Drawing Figures

Patented June 12, 1973
3,738,598
3 Sheets-Sheet 1
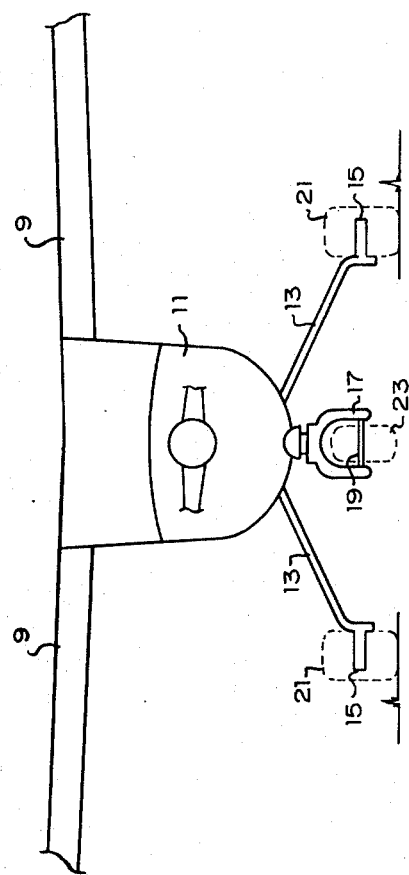
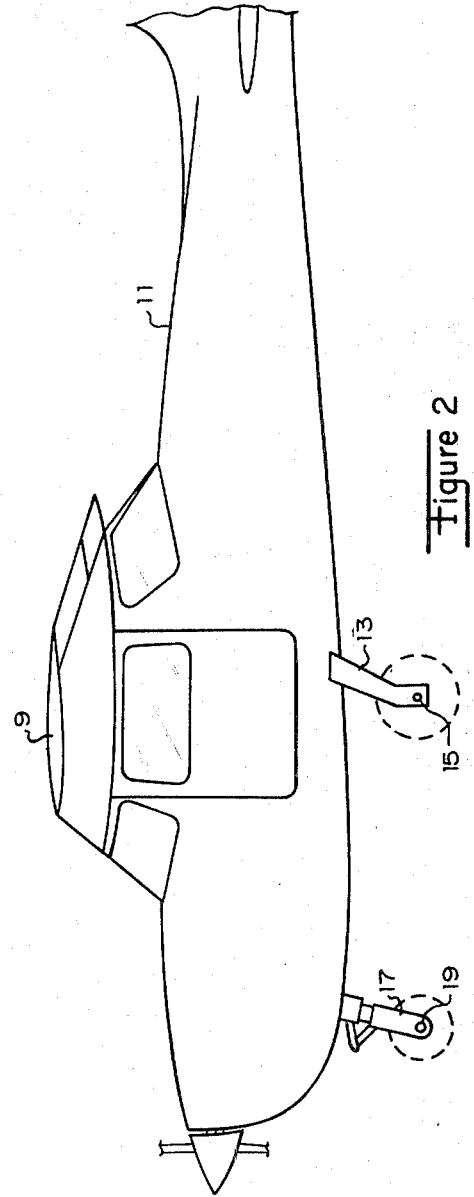

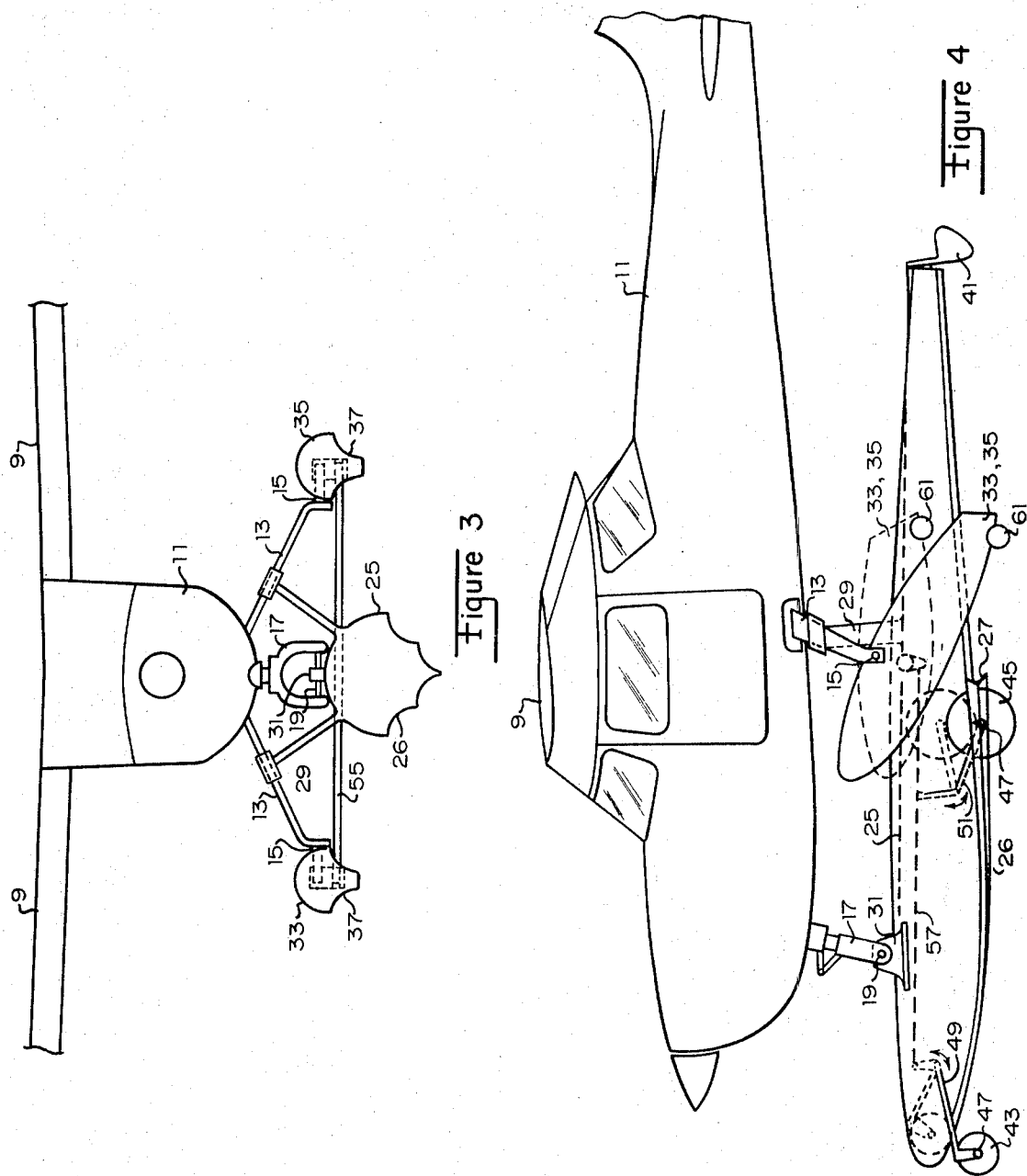

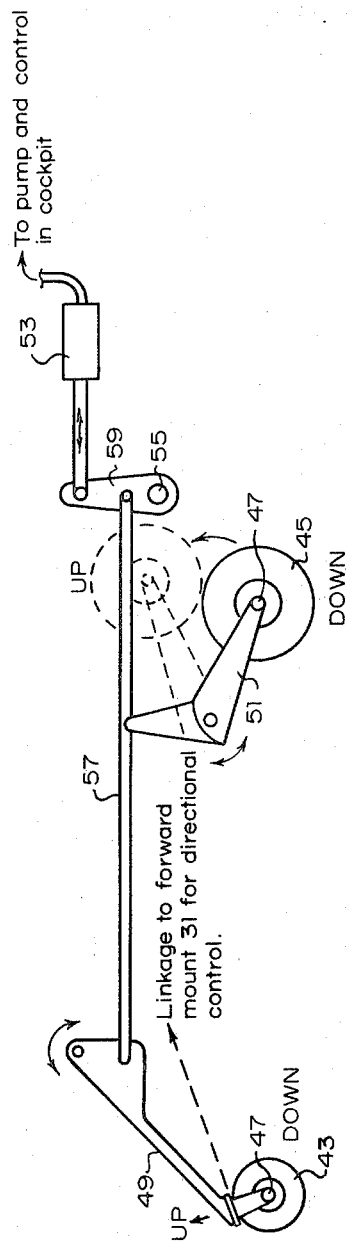

AMPHIBIOUS APPARATUS FOR CONVENTIONAL LAND AIRCRAFT

BACKGROUND OF THE INVENTION

It has long been known that adaptation of flotation apparatus to a conventional land plane facilitates water operation and greatly increases the utility of the aircraft. However, conversion of conventional land aircraft for use in water has not been widely accepted primarily because of the difficulty and expense involved in attaching float apparatus to a land plane. This requires complete removal of all existing land plane landing gear support struts, and substantial structural reinforcement modifications of the fuselage to accommodate float support attachment. This results in a substantially permanent conversion due to the difficulty involved in reversing the procedure to reconvert the plane for land use. Another disadvantage encountered in converting conventional land planes for use in water is the conventional practice of requiring dual floats for stability during operation in water. The dual floats increase the cost and greatly reduce flight performance because of the extra weight and drag. Alternatively, aircraft for use in water have been known to include a single float centrally located beneath the fuselage with additional floats disposed adjacent the wing tips to stabilize the craft during operation in water. One disadvantage encountered with aircraft of this type is that the wing structure must be greatly strengthened in order to withstand the impact commonly associated with water operation. As a result, conversion of a conventional land plane to this configuration is typically not practical because wing-tip floats would require major structural reinforcement of the wings. Another disadvantage in all conventional float installations is the practice of rigid mounting which lacks the ability to absorb the shock loads encountered during water takeoffs and landings, and which thus requires extensive reinforcement at attachment points.

SUMMARY OF THE INVENTION

In accordance with the illustrated embodiment of the present invention, these disadvantages associated with conversion of conventional land planes to waterborne operation are overcome by centrally mounting a single primary float by attachment to the existing struts of the conventional landing gear and by mounting laterally spaced stabilizing floats on the axles of the existing landing gear which is accomplished with removal only of the wheels, and therefore without any structural alteration of the fuselage. A further advantage achieved over conventional float installations is that the shock-absorption capability of this float results from attachment directly to existing landing gear struts, thus utilizing the shock-absorption capability of the existing struts. Further shock-absorption capability is realized by using flexible spring-like supports to attach the primary float to the existing landing gear struts. This permits lighter float construction than is possible with conventional float assemblies with concomitant reduction in cost and in weight for improved performance. In addition, directional control for water operation is provided in accordance with the illustrated embodiment of the present invention by including a water rudder near the rear of the primary float that is controlled by the steering apparatus of the existing landing gear. Further, the conversion may be operated amphibiously by including within the float structures additional land-engaging wheels which may be used in place of the wheels commonly associated with conventional land planes. These auxiliary wheels may be retracted and extended selectively for water and land use, respectively, by manually operated control means conveniently located within the cockpit of the airplane.

DESCRIPTION OF THE DRAWINGS

FIGS. 1 and 2 are respectively front and side views of a conventional land plane having a tricycle landing gear structure;

FIGS. 3 and 4 are respectively front and side views showing the primary float centrally mounted on the landing gear apparatus beneath the plane, and showing the stabilizing floats mounted on the existing axles of the landing gear structure; and FIG. 5 is a simplified pictorial view of the control mechanism used for deploying wheels from the floats for amphibious operation.

DESCRIPTION OF THE PREFERRED EMBODIMENT

Referring now to FIGS. 1 and 2, there are shown front and side views respectively of a conventional land plane having a tricycle landing gear. The plane includes a conventional wing structure 9 and fuselage 11 and includes a pair of laterally spaced struts 13 which carry the axles 15 for the main ground-engaging wheels 21. The landing gear also includes a forward wheel strut 17 of conventional design which has steerage capabilities under control of the control wheel within the cockpit. The forward wheel 23 and the main wheels 21 commonly associated with the tricycle landing gear are shown in dotted form because in the conversion according to the present design these wheels are discarded to expose the axles 15 and 19.

Referring now to FIGS. 3 and 4, there are shown front and side views respectively of the land plane 9, 11 having the float apparatus according to the present invention attached to the conventional landing gear. The float assembly includes the primary buoyant body 25 and a pair of laterally spaced stabilizing buoyant bodies 33 and 35. The primary body or float 25 has an underside surface 26 which forms a hydrodynamically efficient planing surface including a conventional planing step for reduced drag at takeoff and landing speeds. This underside surface 26 is disposed lower with respect to the aircraft 9, 11 than the underside surfaces of the laterally spaced stabilizing bodies or floats 33, 35 to assure that only one float is in contact with water at planing speeds. The primary float 25 is attached to the landing gear at three locations, namely, by two primary struts 29 which clamp to the existing laterally spaced struts 13 of the landing gear and by an additional strut which attaches to the axle 19 of the forward wheel strut 17. In this way, the primary float 25 is centrally positioned beneath the aircraft and protrudes sufficiently far forward ahead of the wheel strut 17 to provide adequate buoyancy for proper flotation during water operation. The primary struts 29 are formed of spring-resilient material to assure that shock loads encountered during water landings are adequately cushioned when imparted to the main landing gear struts 13.

Lateral stability of the aircraft during water operation is assured by the addition of the stabilizing buoyant bodies or floats 33 and 35 which are attached to the axles 15 of the existing main landing gear struts 13. These floats provide buoyant forces at a distance from the central roll axis of the primary float 25 to assure lateral stability of the aircraft 9, 11 at low operating speeds. At high speeds, these floats 33, 35 need not contact water for lateral stability is primarily provided by wing lift and wing aileron control. The floats 33, 35 may include hydrodynamically efficient planing surfaces 37 on the underside to facilitate acceleration. The primary float 25, which is mounted substantially lower than these laterally spaced stabilizing floats 33, 35 assures that the principal buoyant body is the float 25 and that only the float 25 contacts the water initially upon landing. As the speed decreases and the efficiency of the planing surface of the primary float 25 decreases, the float 25 settles deeper in the water and becomes the primary buoyant body that supports the weight of the air-craft 9, 11. Of course, the laterally spaced floats 33, 35 then provide additional buoyant support upon contacting the surface of the water. Similarly, during take-off from water, the laterally spaced floats 33 and 35 remain in contact with water during low speed operation to provide adequate lateral stability and, as the takeoff speed increases and both the planing surface of primary float 25 and the aerodynamic design of wings 9 provide lifting force, the laterally spaced floats 33, 35 disengage the surface of the water, thereby decreasing surface drag during takeoff. As takeoff speed further increases, only the planing surface of the primary float 25 remains in contact with the surface of water until, at takeoff speed, only the portion of the primary float 25 adjacent the step 27 remains in contact with water for minimum operating drag. Lightweight and inexpensive construction of the floats 25, 33, 35 may be accomplished using fiberglas exterior shells filled with foam flotation material, or the like.

Referring now to the side view of FIG. 4, there is shown a water rudder 41 which is mounted at the stern of the primary float 25 to pivot about a substantially vertical axis. This water rudder is attached via suitable linkage 42 (e.g., tie rods, cables, or the like) to the forward mount 31 which is pivotally mounted on the body of the float 25 for rotation with the forward wheel strut 17 of the aircraft 9, 11. In this way, the directional operation of the aircraft during water operation is conveniently controlled from the pilot's wheel within the cockpit.

Referring now to FIGS. 4 and 5, there are shown the simplified details of the wheel-deploying apparatus of the present invention that is useful for converting the float assembly for amphibious operation. A pair of ground-engaging wheels 43, 45 within the primary float 25 are aligned along the central axis of the float 25 with one wheel 43 disposed near the forward end and the other wheel 45 disposed at the approximate location along the length adjacent the transverse axis of the conventional landing gear main wheels 21 of FIG. 1. This assures that the characteristics of the aircraft at touchdown remain substantially unaltered (except, of course, for the vertical elevation of the pilot of the aircraft at touchdown). These wheels 43, 45 and the associated axles 47, 49 are mounted on support arms 49, 51 that are pivotally mounted within the primary float 25 and that are actuated, for example, by a pneumatic or hydraulic actuator 53. This actuator 53 may be hand operated or automatically operated under control from the cockpit to raise and lower the wheels 43, 45 with respect to recessed pockets within the float 25. A torque tube 55 traverses the spacing between the lateral floats 33 and 35 and passes through the primary float 25 where it is coupled to the actuating arm 59 that is coupled, in turn, to the actuator 53. Rotation of the actuating arm 59 and the associated torque tube 55 causes the laterally spaced floats 33, 35 which are attached to the torque tube 55 to be rotated in the direction of the trailing edge downwardly, as shown alternately in FIG. 4. A small wheel 61 carried at the trailing edge of each of the laterally spaced floats 33, 35 is thereby brought down substantially to the common ground plane of contact of the wheels 43, 45. In this way, lateral stability is provided for stable operation of the aircraft during land operations. Also, the forward wheel 43 and the associated axle 47 are linked by conventional means to the forward mount 31 for rotation on the support arm 49 to provide directional maneuverability of the aircraft during land operation.

Therefore, the apparatus of the present invention permits convenient, inexpensive and rapid conversion of a conventional land plane to an amphibious plane capable of operating both on land and on water without requiring conversion from one form of support apparatus to the other.

I claim:

1. Amphibious landing gear apparatus for an aircraft which includes a pair of laterally spaced fixed landing gear struts having axles near the lower ends thereof for rotatably mounting ground-engaging wheels thereon and which includes an additional wheel strut located in a central position along the length of the aircraft for rotatably mounting a third ground-engaging wheel thereon, the apparatus comprising:

a primary buoyant body attached to the laterally spaced landing gear struts and to a wheel strut centrally located along the length of the aircraft; and a pair of stabilizing buouyant bodies disposed to attach to the axles near the lower ends of the laterally spaced landing gear struts.

2. Apparatus as in claim 1 comprising:

support means attached between said primary buoyant body and the laterally spaced landing gear struts at selected locations along the lengths thereof and between said body and said wheel strut for providing at least three-point suspension of said primary buoyant body with respect to said aircraft; and said primary buoyant body having a planing surface on the underside thereof which is disposed lower than the underside surfaces of the laterally spaced buoyant bodies for providing substantially the entire water-contacting support surface about takeoff and landing speeds of the aircraft.

3. Apparatus as in claim 2 wherein:

said support means attached between said body and the wheel strut is rotatable about an axis in response to steerage rotation of said wheel strut of the aircraft;

a water-engaging rudder disposed near the trailing end of the primary buoyant body; and means coupled between said support means attached to said wheel strut and the water-engaging rudder for angularly positioning said rudder in response to steerage rotation of said wheel strut of the aircraft.

4. Apparatus as in claim 3 wherein said wheel strut is centrally located forward of said laterally spaced landing gear struts, and resilient means support said primary buoyant body with respect to the laterally spaced landing gear struts.

5. Apparatus as in claim 1 comprising a pair of ground-engaging wheels carried by said primary buoyant body in alignment along the length of said body, one of said wheels being located near the forward end of said body and the other of said wheels being located near the transverse axis of the axles carried by the landing gear struts of the aircraft.

6. Apparatus as in claim 5 comprising:
a ground-engaging wheel carried by each stabilizing buoyant body near the trailing end thereof; and
means coupled to rotate said stabilizing buoyant bodies about the axles near the lower ends of said landing gear struts for positioning said wheels carried by said stabilizing buoyant bodies at substantially common planar elevation with respect to the ground-engaging wheels carried by the primary buoyant body.

7. Apparatus as in claim 6 comprising actuating means coupled to the ground-engaging wheels carried by said primary buoyant body for selectively extending and retracting said wheels and simultaneously rotating said stabilizing buoyant bodies to extend and retract the wheels carried near the trailing ends thereof with respect to the common planar elevation of the wheels carried by the primary buoyant body.

8. Apparatus as in claim 1 comprising a pair of resilient support means attached to said primary buoyant body and disposed to be attached to the laterally spaced landing gear struts of the aircraft at locations along the exposed lengths thereof between the remote ends near said axles and the proximate ends adjacent the fuselage of the aircraft.

* * * * *